United States Patent
Morgado Junior et al.

(10) Patent No.: US 8,545,795 B2
(45) Date of Patent: Oct. 1, 2013

(54) CONTINUOUS PROCESS FOR THE PREPARATION OF SODIUM TITANATE NANOTUBES

(75) Inventors: Edisson Morgado Junior, Rio de Janeiro (BR); Marco Antonio Santos De Abreu, Rio de Janeiro (BR); Gustavo Torres Moure, Rio de Janeiro (BR)

(73) Assignee: Petroleo Brasileiro S.A., Petrobras, Rio de Janeiro (BR)

(*) Notice: Subject to any disclaimer, the term of this patent is extended or adjusted under 35 U.S.C. 154(b) by 854 days.

(21) Appl. No.: 12/007,970

(22) Filed: Jan. 17, 2008

(65) Prior Publication Data
US 2010/0284902 A1    Nov. 11, 2010

(30) Foreign Application Priority Data
Mar. 21, 2007  (BR) .................................. 0700849

(51) Int. Cl.
*C01G 23/00* (2006.01)
(52) U.S. Cl.
USPC ....................................................... 423/598
(58) Field of Classification Search
None
See application file for complete search history.

(56) References Cited

U.S. PATENT DOCUMENTS

| | | | |
|---|---|---|---|
| 3,417,070 A * | 12/1968 | Hinton | 526/70 |
| 5,885,536 A * | 3/1999 | Hollitt | 423/84 |
| 2005/0036939 A1* | 2/2005 | Wong et al. | 423/598 |
| 2006/0078726 A1 | 4/2006 | Antonio et al. | |

FOREIGN PATENT DOCUMENTS
EP    0 832 847    4/2002

OTHER PUBLICATIONS

Kasuga et al, Formation of Tiranium Oxide Nanotube, Langmuir, 1998, 14, 3160-3163.*
Morgado et al, A study on the structure and thermal stabilityof titanate nanotubes as a function of sodium content, Solid State Sciences, 2006, 888-900.*
Morgado et al, "A study on the structure and thermal stability of titanate nano tubes as a function of sodium content", Solid State Sciences 8, 2006, 888-900.*
Sumio Iijima, "Helical microtubules of graphitic carbon", *Nature*, vol. 354, Nov. 1991, pp. 56-58.
Kasuga et al., "Formation of Titanium Oxide Nanotube", *Langmuir*, vol. 14, No. 12, Apr. 1998, pp. 3160-3163.
Morgado, Jr., et al., "A study on the structure and thermal stability of titanate nanotubes as a function of sodium content", *Solid State Sciences*, vol. 8, 2006, pp. 888-900.
Morgado, Jr., et al., "Characterization of Nanostructured Titanates Obtained by Alkali Treatment of $TiO_2$—Anatases with Distinct Crystal Sizes", *Chem. Mater.*, vol. 19, 2007, pp. 665-676.

* cited by examiner

*Primary Examiner* — Bijay Saha
(74) *Attorney, Agent, or Firm* — Nixon & Vanderhye P.C.

(57) ABSTRACT

The invention relates to a process carried out continuously in one or more reactors connected in series for the preparation of sodium titanate nanotubes and their derivatives obtained by ion exchange and/or thermal treatment, by reacting titanium oxides with sodium hydroxide under suitable hydrothermal conditions to obtain or control the morphology of nanostructural titanates. The reaction mixture is introduced continuously into the reactor at a feed rate that is the same as the rate of discharge of the product. When more than one reactor is used, the material leaving the first reactor is used to feed the next reactor, and a differential of temperature is applied between the reactors in such a way as to obtain in the average, a temperature of between 60° C. and 180° C.

16 Claims, 6 Drawing Sheets dream# CONTINUOUS PROCESS FOR THE PREPARATION OF SODIUM TITANATE NANOTUBES

FIELD OF THE INVENTION

The present invention relates to a continuous process for the preparation of sodium titanate nanotubes and their derivatives obtained by ion exchange and/or thermal treatment, the said method being based on the reaction between titanium oxides and sodium hydroxide under hydrothermal conditions that make it possible to control the morphology of the nanostructural titanates formed. The process is carried out continuously in one or more (at least two) reactors connected in series. The reaction mixture is introduced into the first reactor continuously and, if more than one reactor is used, the material discharged from the first one is fed into the next one. Furthermore, the reactors are preferably heated to different temperatures, with an average temperature of between 60 and 180° C., and a residence time in each of the two or more reactors is less than 30 minutes, the total reaction time is short, being about 90 minutes or less.

ESSENTIAL FEATURES OF THE INVENTION

Nanotubular oxides have been widely studied since the advent of carbon nanotubes [see S. Iijima: "Helicoidal microtubes of graphitic carbon", Nature, 354 (1991), pp. 56-59]. In particular, the development of nanotubes or nanofilaments of titanates or titania (TTNT=TiTanate NanoTube) has attracted the special attention of research workers, owing to their potential applications in photocatalysis, catalysis, photoelectrical cells (optical and gas sensors) and electroceramics.

The first direct synthesis of titanate nanotubes (TTNTs) without the use of moulds (templates) or complicated electrodeposition processes was published by T. Kasuga et al. [see T. Kasuga, M, Hiramatsu, A. Honson, T. Sekino and K. Niihara: "Formation of titanium oxide nanotube", Langmuir, 14 (1998), pp. 3160-63]. These authors used a very simple method, basically consisting of the hydrothermal treatment of either commercial or synthesized crystalline titanium oxide in an aqueous alkaline medium. The method involves the synthesis of titania nanocrystals with a tubular format by the hydrothermal treatment of crystalline titania, used as the starting material, in an aqueous alkaline medium, with 5-20 mol of NaOH per litre, at 60-110° C. for 20 hours, followed by the washing and neutralization of the precipitate obtained.

Owing to its simplicity, this method has since received a great deal of attention from many other research workers, mainly in Asia.

Materials synthesized in the form of nanotubes and nanofilaments score over the corresponding films or granulates by having a better performance in several applications, especially because of their greatly increased specific surface area.

PRIOR ART

In European Patent No. 0 83/2847, Kasuga et al. have described a method for the synthesis of a crystalline titania crystal in the form of a nanotube with a diameter of between 5 and 50 nm by the alkaline treatment of titanium oxide, in which method titanium oxide is heated with sodium hydroxide for 1-50 hours at a temperature of 18-160° C. in a sealed vessel under pressure. The product obtained is washed with water and neutralized. To increase the crystallinity of the product, assumed to be $TiO_2$, the crystals are subjected to thermal treatment in the range 300-800° C. for 60-160 minutes. This publication also deals with the effect of the temperature of the alkaline treatment and the concentration of NaOH on the reaction kinetics, stating that high NaOH concentrations call for a low temperature and low NaOH concentrations need a high temperature. With an NaOH concentration of about 65 wt-%, the reaction is fast, while with an NaOH concentration of less than 13 wt-%, the reaction is slow. At a temperature above 180° C., no nanotubes with the required characteristics are obtained; the pressure has to be higher, and the tubes formed have a smaller diameter.

Few further studies have since been carried out to extend this method to other materials or to develop alternative synthetic routes that are cheaper and can be applied industrially. Most of the published works deal with laboratory-scale investigations and concentrate on the elucidation of the nature of the nanostructural compound synthesized or on the mechanisms involved in the formation of nanotubes.

US Patent Application No. 2005/00 36,939 discloses a method for the preparation of crystalline perovskite nanotubes, such as barium titanate and strontium titanate, by a low-temperature hydrothermal reaction. This method gives nanotubes with an outside diameter of 1-500 nm and a length of between 10 nm and 1 µm. The precursor subjected to the hydrothermal reaction here is a structured titanium oxide nanotube. The starting material used for the synthesis of other nanotubular compounds in this US Patent Application No. 2005/00 36,939 is a titanate nanotube (TTNT) obtained by Kasuga's method.

US Patent Application No. 2006/00 78,726 describes a thermodynamic treatment of nanostructural titanates in an inert, oxidizing or reducing atmosphere to obtain an orthorhombic structure, which—according to the inventors—is a new titanium oxide phase with the formula $TiO_{2-x}$ where x varies between 0 and 1, and which they called the JT phase. This new JT phase permits the preparation of nanomaterials in the form of nanofibres, nanorods, nanotubes, etc., which can be hydrogenated, hydrated and/or rendered alkaline, as well as being stabilized thermally.

These nanomaterials are very promising for use as adsorbents, catalyst supports, photocatalyst supports, and means of hydrogen production and environmental purification.

In a recent report on the synthesis of titanate nanotubes, the latter are obtained by the hydrothermal treatment of $TiO_2$ and NaOH, followed by the washing of the precipitate, and the materials are characterized in detail both before and after the thermal conversion [see Edisson Morgado Jr., Marco A. S. de Abreu, Oscar R. C. Pravia, Bojan A. Marinkovic, Paula M. Jardim, Fernando C. Rizzo and Antonio S. Araújo, Solid State Science, 8 (2006), p. 888]. In view of the results obtained, these authors suggest that the walls of the nanotubes are isostructural with the lamellae present in the bulk form of $Na_2Ti_3O_7$ and have the general formula $Na_{2-x}H_xTi_3O_7.nH_2O$, where $0 \le x \le 2$ and $0 < n < 1.2$, depending on the degree of exchange of sodium for hydrogen in the washing stage. The authors also state that the amount of water intercalated between the lamellae, i.e. the magnitude of n, is directly proportional to the sodium content, and the removal of sodium leads to an increase in the specific surface area, but also to a decrease in the thermal stability of the nanotube formed, as well as to different thermal decomposition products. The same authors have more recently published an article in Chemistry of Materials, 19 (2007), in which they discuss the effect of the starting $TiO_2$ on the kinetics of nanotube formation in the Kasuga reaction. They state that anatase-type titanias with a small crystallite size and a high reactivity lead to the rapid formation of lamellar titanates but give a very low yield of nanotubes. There is therefore a conflict between the reaction rate and the nanotube yield, which is undesirable from the industrial point of view.

However, the investigations reported so far have been carried out on a laboratory scale. Another aspect to be mentioned is that the technical and scientific literature invariably deals with high dilutions and batch processes.

We have studied the problem of scaling up the method proposed by Kasuga, which is considered the most promising one for industrial purposes. It has thus been found possible to obtain titanates in nanotubular form in a high yield even when starting with highly reactive titanias. This makes it feasible to prepare titanate nanotubes (TTNTs) in a brief reaction by a continuous process carried out in a number of reactors connected in series and optionally operated at different temperatures, which has not been described before in the literature.

It has also been found possible to control the dimensions and the specific surface area of the synthetic nanotubes by varying the stirring intensity of the reaction medium, particularly in the case of more concentrated reaction mixtures, which are of industrial interest.

BRIEF DESCRIPTION OF THE INVENTION

The present invention relates to a continuous process for the preparation of sodium titanate nanotubes by the thermal treatment of titanium oxides, especially anatase, in the presence of an alkali metal hydroxide, especially sodium hydroxide, in a sealed reactor with mechanical stirring and at a suitable average temperature, in which process at least one reactor is operated continuously at a constant level, where the flow rate for the introduction of the reaction mixture is the same as the flow rate at which the product is discharged, or else at least two reactors, connected in series, are used in such a way that the material discharged from the first reactor is used as the feedstock for the next one. In this second case, the process is carried out in such a way that the reactors can be operated with a temperature gradient, but the mean temperature for the reactors remains around 140° C.

The sodium titanate nanotubes obtained have a length of hundreds of nanometres, an outside diameter of 5-50 nm and a specific BET surface area of 50-450 $m^2/g$, depending on the titania used as the starting material, on the hydrothermal conditions of the reaction, and on the degree of exchange of sodium ions for hydrogen ions or for other cations when the compound synthesized is washed.

The resulting nanostructures can then be subjected to a thermal treatment in an inert, oxidizing or reducing atmosphere in order to obtain adsorbents, catalysts, photocatalysts, catalyst components (matrices or supports), starting materials for catalyst compositions or additives to catalysts.

DETAILED DESCRIPTION OF THE INVENTION

Figure 1:
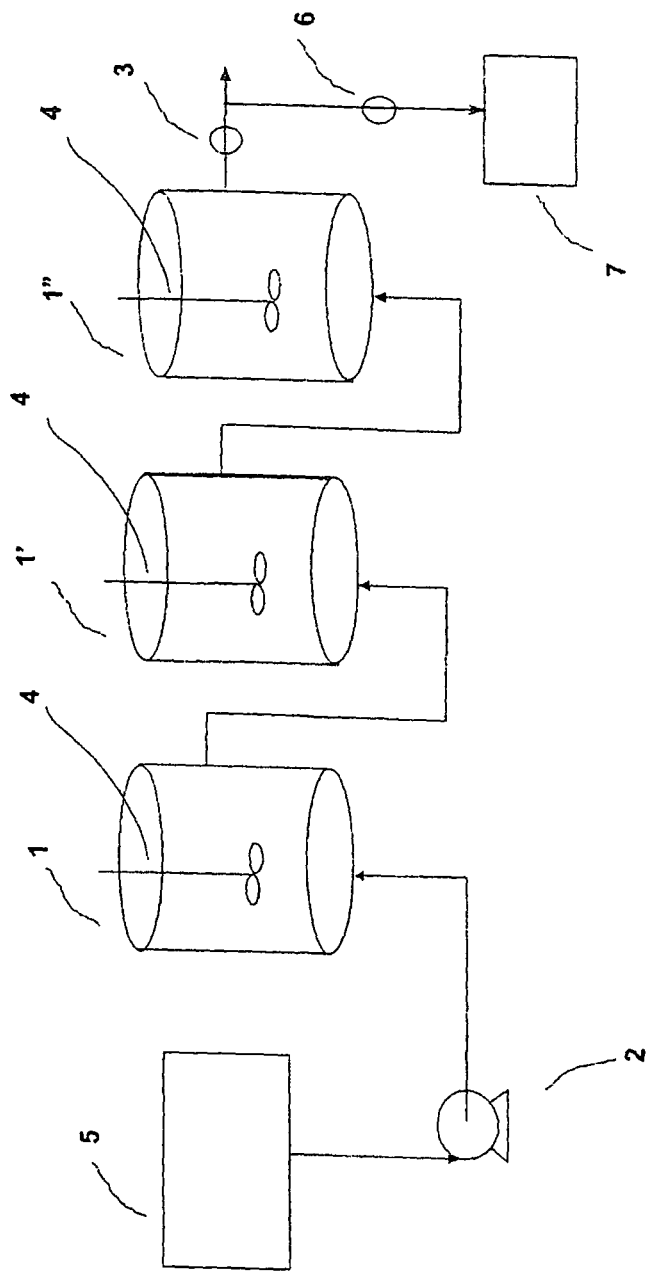
FIG. 1 shows a schematic diagram of the method according to the invention.

An aspect not mentioned in the prior art, including Kasuga's patent, is that the hydrothermal treatment of the starting titania suspended in an alkaline medium causes a very great increase in the viscosity of the medium during the reaction in which nanotubes are formed. This limits the solids content of the suspension at which the product can be handled. Most published works mention that the $TiO_2$ concentration of the aqueous suspension is less than 1 wt-%, and sometimes less than 0.1%.

This is a great drawback from the industrial point of view, since it means that the solid product is obtained in a low yield in comparison with the volume of the reaction mixture, and a large amount of liquid discharge is produced.

The aim of the method according to the invention is to maximize the solids content ($TiO_2$) of the reaction mixture to a value of 1-10 wt-% by working at the viscosity limit of the reaction mixture while ensuring its homogeneity by mechanical stirring. It is necessary to apply intense stirring at a speed of generally 50-1000 rpm, depending on the type of stirrer used in the process. The titanium oxide source used in the preparation of the reaction mixture can be chosen from amongst the oxide salts of titanium (e.g. $TiOCl_2$ and $TiOSO_4$), amorphous titania, anatase, rutile and brookite with a small crystallite size and a high reactivity in an alkaline medium. However, the method according to the invention can also be used when the titania used as a starting material has a low reactivity.

Some pilot-scale experiments were carried out batchwise in the first stage of the work, and it was found that the specific surface area of the product (i.e. the surface area per unit weight—$m^2/g$) can be controlled via the stirring intensity of the high-viscosity reaction mixture formed in the hydrothermal treatment. The data given in Table 1 below show that the specific surface area clearly increases with decreasing stirring intensity during the hydrothermal reaction. It should be, mentioned that the samples obtained at different stirring intensities are compared here at two different sodium contents (different degrees of washing and exchange for hydrogen in the titanate nanotube), because this variable also affects the specific surface area of the product. Basically the following procedure was used in the pilot plant experiments.

330 g of $TiO_2$ (commercial anatase in powder form, marketed as FINNTi®-S140) were added to 4670 g of a 30% solution of NaOH (wt/wt). The mixture was homogenized for 10 minutes and placed in a 6-litre autoclave fitted with a helicoidal stirrer driven by a high-torque mixer. The reactor was sealed, and the required stirring intensity was set by adjusting the number of revolutions per minute (rpm), using a digital control unit. The reactor was heated with the aid of circulating hot oil, which came from a thermostatically controlled tank and was passed through the jacket around the reactor. The reaction temperature was monitored with the aid of a thermocouple located in a well inserted into the middle of the reaction mixture. When the temperature had reached 100-120° C., the mixture was allowed to stand for 15 hours under the same conditions until all the starting anatase $TiO_2$ had been converted into lamellar sodium titanate. The highly viscous suspension was then re-suspended in 20 litres of water and filtered under reduced pressure.

The filter cake was washed with a further 20 litres of water and sometimes mixed with 60 litres of a dilute solution of HCl at 4.5 or 1.5. This was followed by filtration and washing with a further 20 litres of water.

After washing, the filter cakes were dried at 120° C. for hours in an oven with air circulation, giving a white powder.

The product obtained in the first case contained about 9.5% of Na, while the products obtained in the second and third case contained about 4.5% and 0.5% of Na, respectively. The products were characterized by X-ray diffraction (XRD), thermogravimetric analysis (TGA) and transmission electron microscopy (TEM). The results show that in all three cases, the starting $TiO_2$ (anatase) was fully converted into nanomaterials with a lamellar titanate structure having the general formula $Na_xH_{2-x}Ti_3O_7 \cdot nH_2O$.

This procedure was repeated by varying only the stirring intensity during the hydrothermal reaction, using no stirring in one case and stirring the reaction mixture at 50 rpm and at 400 rpm in the other cases. The results reproduced in Table 1 show that the specific surface area of the nanostructural titanates obtained can be controlled by altering the intensity at which the reaction mixture is stirred during the hydrothermal treatment.

TABLE 1

|  | Washing with water | | Washing with HCl solution at pH 4.5 | | | Washing with HCl solution at pH 1.5 | |
| --- | --- | --- | --- | --- | --- | --- | --- |
| Temperature, °C. | 120 | 120 | 120 | 120 | 120 | 100 | 100 |
| Stirring speed, rpm | 50 | 400 | 0 | 50 | 400 | 50 | 400 |
| % of Na | 9.5 | 9.3 | 4.8 | 4.2 | 4.8 | 0.6 | 0.5 |
| BET surface area, $m^2/g$ | 121 | 45 | 240 | 107 | 55 | 392 | 293 |

According to the transmission electron micrographs, the resulting nanostructural titanates had a relatively low nanotube yield, but their specific surface area could be controlled and optimized.

To remedy this, pilot-scale experiments were carried out in the second stage of the work, but this time a continuous process was used. The procedure employed is described below with reference to FIG. 1, which is attached and forms an integral part of this Description, being included here to explain the invention in more detail.

As shown in FIG. 1, a set of one or more reactors (1, 1', 1") is arranged in such a way that it can be fed continuously by a pump (2) at a pressure controlled by a pressure regulator (6), located at the outlet of the assembly.

Each reactor (1, 1', 1") is fitted with a suitable stirrer (4) coupled to a speed control unit, and each reactor can be heated independently according to the operating conditions used in the process. Such heating can be provided by passing circulating hot oil or superheated steam through the jacket around the reactor or by directly injecting steam into the reaction mixture, so that the reaction temperature ($T_1$, $T_2$, $T_3$) in each reactor can be controlled and monitored.

Prior to introducing the reaction mixture proper, the system is "conditioned" by continuously injecting water into it until the temperature, pressure and feed rate stabilize at the required values.

The reaction mixture consists of a titanium oxide source in powder or gel form, admixed to a solution of an alkali metal hydroxide, for example sodium hydroxide. The mixture is prepared and transferred into a feed tank (5), from which it is continuously pumped into the set of reactors at a sufficiently high pressure to prevent the sudden evaporation of water (flash effect) on contact with the hot reactor. When more than one reactor is used, the reactors can be kept at the same temperature, but it is preferable to use a descending temperature gradient from one reactor to the next, although the mean temperature has to lie between 60 and 180° C. and preferably between 120 and 160° C.

The output of the feed pump (2) determines the residence time in the reactors. An overall reaction time of 90 minutes or less is preferable when the titanium oxide source is highly reactive, but a low-reactivity titania can also be used in conjunction with suitably adjusted reaction times.

The material discharged at the outlet of the last reactor is continuously cooled in a heat exchanger (3), and the product (7) is collected in the form of a suspension.

The suspension is decanted, filtered under reduced pressure or centrifuged to separate off the mother liquor, which has a high alkali metal hydroxide content and can be recycled for the preparation of a fresh reaction mixture.

The filter cake containing the product (7) is washed with water several times and optionally also with acid solutions and/or solutions of metal cations to promote the ion exchange of sodium.

The acids that can be used are exemplified by hydrochloric, nitric and sulphuric acid, while examples of the metal salts are chlorides, nitrates and other soluble salts of metals in the rare earth group (such as for example La and Ce), metals of group VI and group VIII, alkali metals and alkaline earth metals (for example Mg, Ca and Ba) and/or transition metals (for example Mn, Fe, Co, Ti, Zr, Cu, Cr, Ni, Ru, Zn, Cd, Mo, W, V, Ta and Sn). Salts or hydroxides of these metals can also be included optionally in the reaction mixture to incorporate them in the titanate structure during the hydrothermal synthesis.

The wet precipitate obtained after the synthesis, washing and ion exchange can be dried by various methods known to the expert in the field. If required, the product can be moulded to form nanostructural titanate objects, possibly with the aid of binders and/or fillers, such as for example hydrated aluminas of the peptized boehmite type. Suitable shaping methods include spray drying, pelletizing, granulation, extrusion (generally combined with kneading and optional acid peptization with boehmites), by the dripping method or any other conventional shaping method used to prepare adsorbents and catalysts, or else combinations of these methods.

The resulting nanotubular titanates, which may be in the form of a wet precipitate, a dry powder, a moulded object or a material obtained after thermal treatment, can be used in various fields of application. However, they can also be converted after the thermal treatment into nanotubes, nanofilaments and nanoribbons of titanium oxide, sodium trititanate or sodium hexatitanate, depending on the sodium content of the composition and on the calcination temperature.

The wall thickness obtained by manipulation according to the invention can affect the final texture, the thermal stability and/or the mechanical strength of the product.

The nanotubular titanates prepared by the method according to the invention and the nanostructures obtained after the thermal treatment are highly suitable for use as adsorbents, catalysts, photocatalysts and electrocatalysts (fuel cells) or as catalyst components (matrices or supports), starting materials for catalyst compositions or additives to catalysts. Other possible applications include for example the formation of intercalation electrodes for rechargeable lithium batteries, composites for solar energy conversion, gas sensor systems, and means for the storage and separation of hydrogen.

The following examples are included here for the purpose of illustrating the invention but without limiting its scope in any way, which is set out in the Claims but without prejudice to the inventive concept.

Example 1

The reactor used had a capacity of 6 litres and was suitable for continuous operation, with the feed rate of the reaction mixture being the same as the discharge rate of the product. The reactor was sealed and fitted with a helicoidal stirrer driven by a high-torque mixer with speed control, set at 400 rpm. The reactor was heated with the aid of circulating hot oil that came from a thermostatically controlled reservoir and was passed through the jacket surrounding the reactor in question. The temperature was monitored with the aid of a thermocouple located in a well inserted into the reactor. Before introducing the reaction mixture, the reactor was conditioned by the continuous injection of water into it until the temperature, pressure and feed rate had reached the required values.

611 g of $TiO_2$ (commercial anatase in powder form, marketed as FINNTi®-S140) were added to 49.400 g of a 27% solution of NaOH (wt/wt) in a feed tank, from which the reaction mixture was continuously pumped into the reactor heated to a temperature of 150° C. and kept at a pressure of 10 $kg/cm^2$, the overall residence time being 30 minutes. The liquid discharged from the reactor was continuously cooled with the aid of a heat exchanger provided there, and the product was collected in the form of a suspension. A portion of this suspension was filtered under reduced pressure, and the filter cake was re-suspended in water and filtered again under reduced pressure. The resulting filter cake was again re-suspended and washed repeatedly with water until the pH of the filtrate had dropped below 10.0.

Figure 2:
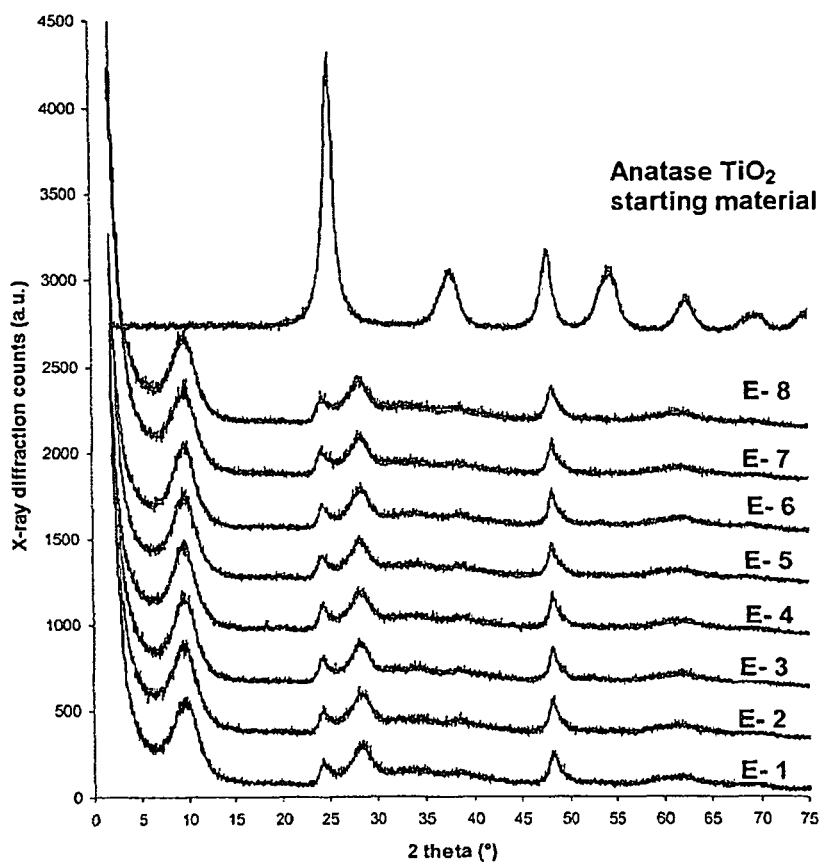
FIG. 2 shows the X-ray diffraction diagrams recorded for the purpose of characterizing the products obtained.
Figure 3:
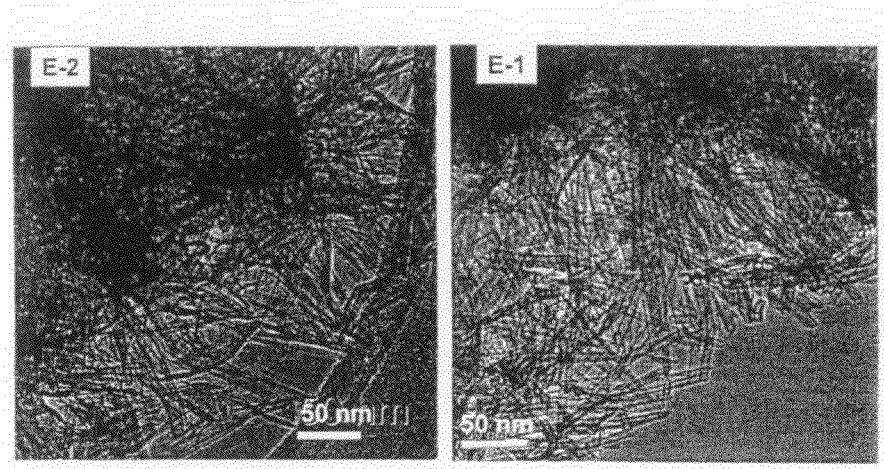
FIGS. 3-6 show the transmission electron micrographs of the products obtained by the method according to the invention.

After washing, the filter cake was dried at 120° C. for 15 hours in an oven with air circulation, which gave a white powder (sample E-1). This product was investigated by X-ray diffraction analysis to study its crystalline phase, by flame photometry to determine its sodium content, by the nitrogen adsorption method to measure its BET surface area, and by transmission electron microscopy to elucidate its morphology. The resulting X-ray diffractogram of the product is shown in FIG. 2, while its electron micrograph is shown in FIG. 3.

Example 2

For this comparative example, the reaction was carried out with the same mixture and under the same hydrothermal conditions as those used in Example 1, but the reactor was now used according to the conventional batch process.

61 g of $TiO_2$ (commercial anatase in powder form, marketed as FINNTi®-S140) were added to 4.940 g of a 27% solution of NaOH (wt/wt), the ratio between these reactants being exactly the same as in Example 1.

This mixture was introduced into a 6-litre reactor fitted with the same stirrer and heating arrangement as those used in Example 1. The reactor was sealed and isolated for batch operation. The stirrer was operated at a speed of 400 rpm, and the reactor was heated with circulating hot oil that was taken from a thermostatically controlled reservoir and passed through the jacket around the reactor. The reaction temperature was monitored with the aid of a thermocouple located in a well inserted into the middle of the reaction mixture. When the reaction temperature had reached 150° C., the reaction mixture was maintained under these conditions for 30 minutes, so the temperature and the reaction time were the same as in Example 1 where the continuous process was used.

At the end of the reaction, the suspension was filtered, re-suspended and washed in the same way as the precipitate obtained in Example 1, keeping the same ratio between the volume of water and the weight of the product on a dry basis. The filter cake was dried at 150° C. for 15 hours in an oven with air circulation, giving a white powder (sample E-2). The X-ray diffractogram of the latter is shown in FIG. 2, and its electron micrograph is shown in FIG. 3.

Since both E1 and E2 had been washed with water in the same way, they had a similar sodium content of about 11% of Na (wt/wt). The X-ray diffractograms shown in FIG. 2 indicate that the starting $TiO_2$ (anatase) was fully converted into similar crystalline structures of lamellar trititanates in both cases. However, as can be seen from FIG. 3, when the product E2 was viewed under a transmission electron microscope, only open or partially rolled-up sheets were found, while in the case of product E1, obtained by the continuous process proposed in the present invention, there was a higher yield of nanotubes, i.e. of lamellar structures with a complete rolling-up or curving-round into nanotubes. It is believed that the $TiO_2$ source is quickly dissolved and gives rise to soluble species, which recrystallize into lamellar titanate sheets. To reach the least-energy state, with the smallest area-to-volume ratio, these sheets can either continue to grow or they can fold up to form nanotubes. These two processes compete with each other, but it is more difficult for large sheets to roll up and form nanotubes.

In the batch process, the whole amount of the $TiO_2$ source is introduced into the reaction at once, and if it dissolves quickly, the high concentration of the titanate precursor species tends to favour the formation and growth of lamellar particles before they can fold up or roll up into nanotubes. When a continuous process is used according to the teaching of the present invention, however, there is a constant supply of the $TiO_2$ source, with a steady replenishment of the reaction mixture, so the dissolution and recrystallization processes are controlled. As a result, the growth of the nanosheets is curbed, while their rolling-up into nanotubes is promoted.

Example 3

A set of three reactors was arranged as shown in FIG. 1. Each reactor, with a capacity of 6 litres, was sealed and fitted with a helicoidal stirrer driven by a high-torque mixer with digital speed control. Each reactor was heated independently with circulating hot oil that came from a thermostatically controlled reservoir and was passed through the jacket around each reactor. The reaction temperature was monitored with the aid of a thermocouple placed in a well, which was inserted into each reactor. Prior to the introduction of the reaction mixture, the reactors were conditioned by the continuous injection of water into them until the temperature, pressure and feed rate had reached the required values, these parameters being decisive for the reaction time.

611 g of $TiO_2$ (commercial anatase in powder form, marketed as FINNTi®-S140) were added to 49.400 g of a 27% solution of NaOH (wt/wt) in a feed tank. The reaction mixture was continuously pumped from the latter into the set of heated reactors, where the pressure was 11 $kg/cm^2$. The temperature was 180° C. in the first reactor, 140° C. in the second, and 100° C. in the third. The total residence time was 90 minutes, being about 30 minutes in each reactor. All three reactors were stirred at a speed of 400 rpm. The liquid discharged from the third reactor was continuously cooled with the aid of a heat exchanger provided there, and the product was collected in the form of a suspension.

5 kg of this suspension were filtered under reduced pressure, and the filter cake was re-suspended in 20 litres of water, after which the resulting mixture was filtered again under reduced pressure. The filter cake thus obtained was re-suspended and washed three more times, using 20 litres of water.

After washing, the filter cakes were dried at 120° C. for 15 hours in an oven with air circulation. This gave a white powder (sample E-3), which was analysed by X-ray diffraction to study its crystalline phase, by flame photometry to determine its sodium content, by the nitrogen adsorption method to measure its BET surface area, and by transmission electron microscopy to establish its morphology.

Figure 4:
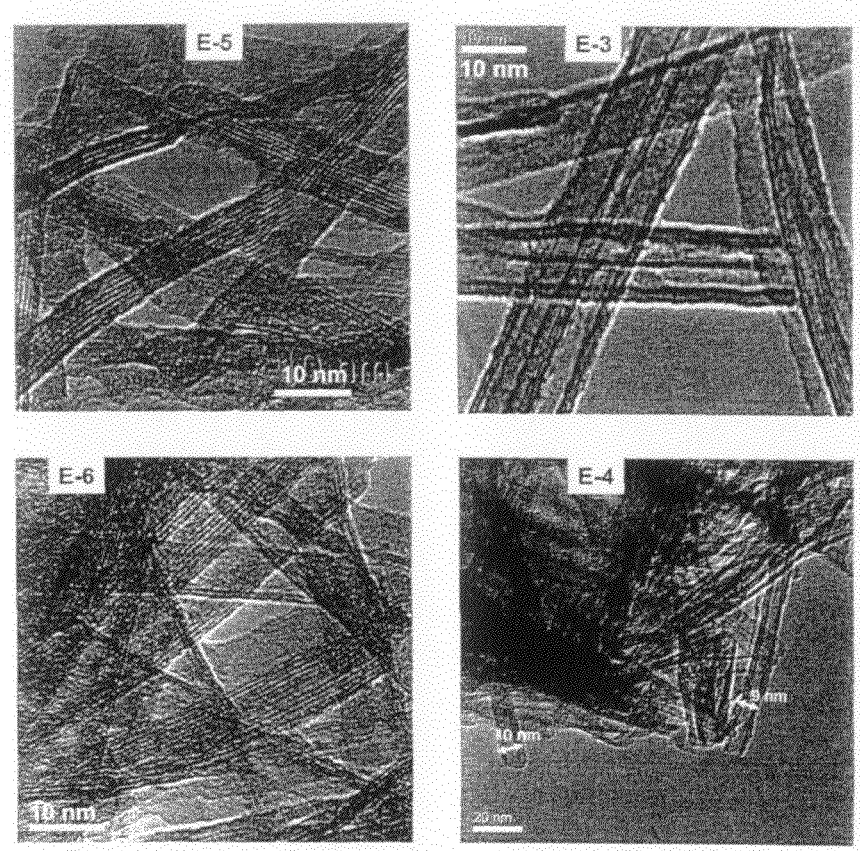

The X-ray diffractogram and the electron micrograph of the product are shown in FIG. 2 and FIG. 4, respectively.

Example 4

The continuous process used in Example 3 was repeated, but now an isothermal system was used, that is, all three reactors were heated to the same temperature (140° C.), the mean temperature of the system and the reaction time being the same as in Example 3. When the reaction had reached completion, the suspension was filtered, and the material obtained was re-suspended and washed in the same way as the precipitate obtained in Example 3.

After washing, the filter cake was dried at 120° C. for 15 hours in an oven with air circulation. This gave a white powder (sample E-4), which was analysed by the methods described above. The X-ray diffractogram and the electron micrograph are shown in FIG. 2 and FIG. 4, respectively.

Example 5

In this comparative example, the reaction was carried out on a pilot scale by the conventional batch process.

61 g of $TiO_2$ (commercial anatase in powder form, marketed as FINNTi®-S140) were added to 4.940 g of a 27% solution of NaOH (wt/wt), the ratio being exactly the same as that between the reactants in Example 3.

The mixture was placed in one of the 6-litre reactors used in Example 3, which was fitted with the same stirring and heating arrangement and was sealed and isolated from the other reactors in order to operate it batchwise. The reactor was stirred at 400 rpm and heated by circulating hot oil that came from a thermostatically controlled reservoir and was passed into the jacket around the reactor. The reaction temperature was monitored with the aid of a thermocouple placed in a well that was inserted into the middle of the reaction mixture. When the temperature had reached 140° C., the reaction mixture was maintained under these conditions for 90 minutes, adopting the same mean temperature and reaction time as in Examples 1 and 2, where a continuous process was used.

When the reaction had reached completion, the suspension was filtered, and the material obtained was re-suspended and washed in the same way as the precipitate obtained in Example 3, keeping the same ratio between the volume of water and the weight of the product on a dry basis. The washed filter cake was dried at 120° C. for 15 hours in an oven with air circulation, giving a white powder (sample E-5). The X-ray diffraction diagram and the electron micrograph for this product are shown in FIGS. 2 and 4, respectively.

Example 6

Exactly the same continuous process was carried out here as in Example 3, but with the opposite temperature gradient over the reactor series, i.e. with the first reactor being heated to 100° C., the second to 140° C. and the third to 180° C. The overall residence time was still 90 minutes, with about 30 minutes in each reactor. When the reaction had reached completion, the suspension was filtered, and the material obtained was re-suspended and washed in the same way as the precipitate in Example 3.

After washing, the filter cake was dried at 120° C. for 15 hours in an oven with air circulation. This gave a white powder (sample E-6), which was analysed by the methods described above.

Since the products E-3, E-4, E-5 and E-6 had all been subjected to the same washing procedure with water, they showed a similar sodium content of about 8% of Na (wt/wt). The X-ray diffraction diagrams in FIG. 2 indicate that in all four cases there was a complete conversion of the starting $TiO_2$ (anatase) into crystalline structures of similar trititanate lamellae, to which the approximate chemical composition of $Na_{1.5}H_{0.5}Ti_3O_7 \cdot H_2O$ was assigned on the basis of additional data obtained by thermogravimetric analysis and flame photometry.

Table 2 shows that the specific surface area of the various products was also similar, with sample E-1 having a slight advantage over the others.

TABLE 2

| | E-3 | E-4 | E-5 | E-6 |
|---|---|---|---|---|
| Mode of operation | Continuous, with decreasing gradient | Continuous, with no gradient | Batch process | Continuous, with increasing gradient |
| Temperature, ° C. | 180-140-100° C. (mean: 140° C.) | 140° C. | 140° C. | 100-140-180° C. (mean: 140° C.) |
| Time | 3 × 30 = 90 min | 90 min | 90 min | 3 × 30 = 90 min |
| BET surface area, $m^2/g$ | 252 | 226 | 234 | 224 |

However, the transmission electron micrographs of the various samples indicated rather significant differences in the morphology of the titanates. Although all the samples showed typical multilamellar crystalline formations of trititanates, only samples E-1 and E-2, obtained by the method according to the invention, had an appreciable yield of nanostructures with a tubular morphology. This effect is clearly shown in FIG. 3.

However, it was the combination of a continuous process and the use of an increasing temperature gradient that was the most favourable for the yield of nanotubes.

Even a thorough examination of sample E-5, obtained by the conventional batch process, failed to reveal a significant formation of nanotubes. This confirms the results obtained before on a laboratory scale, with 50 g, reported in the literature for this type of anatase $TiO_2$ starting material [see Morgado et al., Chem. Mater., 19 (2007)]. Similarly, only a few nanotubes were found in sample E-6, where the temperature gradient was opposite to that proposed in the present invention.

Example 7

The continuous procedure used in Example 3 was repeated exactly, except that the first, second and third reactors were heated to 150, 125 and 100° C., respectively. The overall residence time was still 90 minutes (about 30 minutes in each reactor), but the mean temperature was 125° C. When the reaction had reached completion, the suspension was filtered, and the material obtained was re-suspended and washed in the same way as the precipitate obtained in Example 3.

Figure 5:
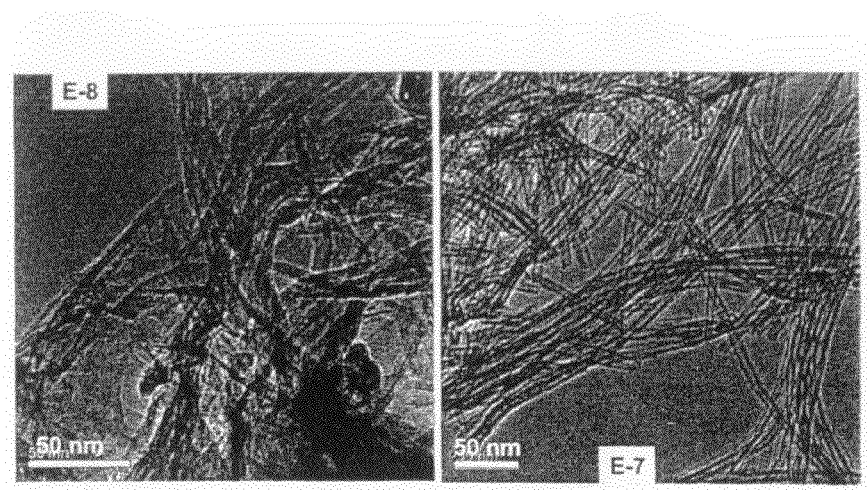

After washing, the filter cake was dried at 120° C. for 15 hours in an oven with air circulation. This gave a white powder (sample E-7), which was analysed by the methods described before. The X-ray diffractogram and the electron micrograph of the product are shown in FIG. 2 and FIG. 5, respectively.

Example 8

In this comparative example the reaction was carried out on a pilot scale by the conventional batch process. 61 g of $TiO_2$ (commercial anatase in powder form, marketed as FINNTi®-S140) were added to 4.940 g of a 27% solution of NaOH (wt/wt), the ratio being exactly the same as that used for the reactants in Example 7.

The mixture was reacted in exactly the same way as in Example 5, except that the reaction temperature was now 125° C. in order to have the same mean reaction temperature and the same reaction time as those used in Example 7, where a continuous process was employed. When the reaction had reached completion, the suspension was filtered, and the material obtained was re-suspended and washed in the same way as the precipitate in Example 5, keeping the same ratio between the volume of water and the weight of the product on a dry basis.

After washing, the filter cake was dried at 120° C. for hours in an oven with air circulation, giving a white powder (sample E-8).

Since the products had been subjected to the same washing process with water as those in the previous examples, they had a similar sodium content of around 8-10% of Na (wt/wt). The X-ray diffractogram shown in FIG. 2 indicates that even the use of a lower mean reaction temperature ensures the complete conversion of the starting anatase into lamellar structures of trititanate with a chemical composition similar to that mentioned above, i.e. $Na_{1.5}H_{0.5}Ti_2O_7 \cdot H_2O$. Samples E-7 and E-8 had a specific surface area of 195 and 188 $m^2/g$, respectively.

However, examination under an electron microscope again revealed clear morphological differences between the various synthetic titanates. The X-ray diffractogram and the electron micrograph are shown in FIGS. 2 and 5, respectively.

Sample E-7, obtained by the method according to the invention, showed a notable yield of nanotubes, whereas sample E-8, which had been synthesized by the isothermal method in batch mode, showed no nanotubular structures but instead predominantly exhibited two-dimensional lamellar titanates, such as sheets, plates and nanoribbons. This comparison is illustrated in FIG. 5, which clearly shows the general observation made by the electron microscope specialist. This confirms the favourable effect the method according to the invention has on the way the sodium trititanate lamellae are made to assume a nanotubular conformation during the process in which the titania is rapidly converted into titanate, because the starting is a highly reactive titania, such as that used in these examples.

Example 9

The titanium oxide source used in this example was a commercial anatase with a larger crystallite size (220×8 nm) than that used in the previous examples.

The reaction mixture was prepared from 537 g of $TiO_2$ (commercial anatase in powder form, marketed as TIONA® by Millenium), added to 49.400 g of a 27% solution of NaOH (wt/wt) in a feed tank, from which the reaction mixture was continuously pumped into the set of reactors, kept under a pressure of 11 $kg/cm^2$.

The continuous process used in Example 3 was repeated exactly, but the first, second and third reactor were now heated to 200, 150 and 100° C., respectively. The overall residence time was again 90 minutes (about 30 minutes in each reactor), and the mean temperature was 150° C. When the reaction had reached completion, the suspension was filtered, and the material obtained was re-suspended and washed repeatedly with deionized water.

After washing, the filter cake was dried at 120° C. for 15 hours in an oven with air circulation. This gave a white powder (sample E-9), which was analysed by the methods described above. The X-ray diffractogram of the product E-9 showed a considerable conversion of the starting titania into a lamellar titanate phase. However, the conversion was incomplete, for a small percentage of anatase remained unchanged.

Figure 6:
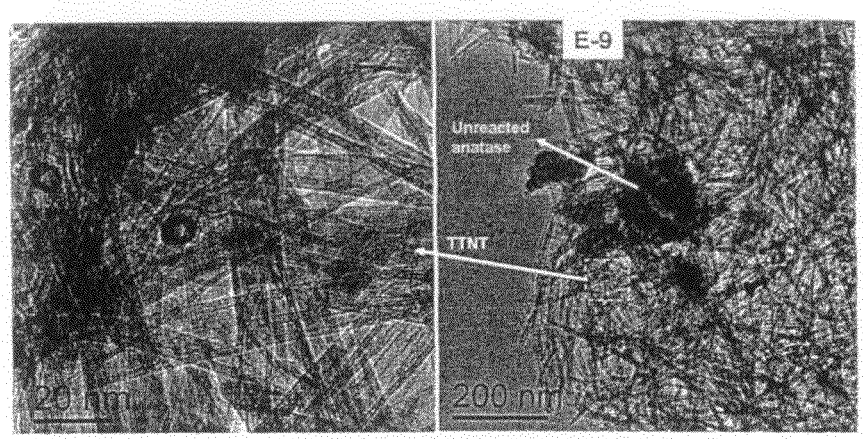

On the other hand, the electron microgram shown in FIG. 6 indicates a high yield of titanate nanotubes in this product, while confirming the presence of isolated particles of unchanged anatase. This example shows that a residence time longer than 90 minutes would be needed to achieve a full conversion in this case, but this was not possible, due to the lower limit of the pump output. However, this case also shows evidence of an intense formation of nanotubes in the converted titanate phase when the method according to the invention is carried out with a titanium oxide source that has a lower reactivity.

Example 10

The composition of the reaction mixture was changed in this example in order to illustrate the present method in the case of a higher $TiO_2$/NaOH ratio and a higher solids concentration of the $TiO_2$/$H_2O$ system.

The reaction mixture was prepared from 2633 g of $TiO_2$ (commercial anatase in powder form, marketed as FINNTi®-S140), admixed to 37.000 g of a 40% solution of NaOH (wt/wt) in a feed tank, from which the mixture was continuously pumped into the reactor series, pressurized to 11 $kg/cm^2$. Exactly the same continuous process as that described in Example 3 was carried out, and the first, second and third reactor were heated to 180, 140 and 100° C., respectively, the overall residence time being 90 minutes. When the reaction had reached completion, the suspension obtained was much more viscous than those obtained in the previous examples, but the continuous operation still proceeded without any problems. It should be mentioned that, when a batch process was used in an experiment, the cooling of the reacted mass had to be followed by a complicated process to empty the reactor, because the mass did not flow out by gravity alone.

By contrast, the viscous product obtained by the continuous process according to the present invention flowed out continuously from the in-line heat exchanger into a collecting tank without any discharge problems. The suspension obtained in this way was diluted with water and filtered under reduced pressure.

The resulting filter cake was re-suspended and washed repeatedly with deionized water.

After washing, the filter cake was dried at 120° C. for 15 hours in an oven with air circulation. This gave a white powder (sample E-10), which was analysed by the same methods as before. Product E-10 had the same diffractogram as sample E-3 illustrated in FIG. 2, again showing a complete conversion of the starting titania into lamellar-phase titanate. The specific surface area of the product was found to be 207 $m^2/g$, rising to 395 $m^2/g$ after repeated ion-exchange operations with a 0.1 M solution of HCl.

When the sample was examined under a transmission electron microscope before and after the ion exchange, the picture showed a significant formation of tubular nanoparticles as in Examples 1 and 3, confirming the effect claimed in the present invention.

As these examples indicate, many other combinations can be adopted by the expert in the field without violating the scope of the invention presented here.

The invention claimed is:

1. Continuous process for the preparation of sodium titanate nanotubes, the process comprising the following steps:
    a) preparing a reaction mixture comprising a titanium oxide and a solution of sodium hydroxide at a concentration of between 10% and 50% (wt/wt), such that the final $TiO_2$ concentration in the reaction mixture is between 0.1 and 10% (wt/wt), then transferring the reaction mixture into a feed tank,
    b) continuously pumping the reaction mixture from the feed tank into two or more reactors interconnected in series via a suitably pressurized system, so that the pumping determines an overall residence time in the two or more reactors, wherein a residence time in each of the two or more reactors is less than 30 minutes, and the overall residence time is less than 90 minutes;
    c) independently controlling and heating the set of two or more reactors at temperatures between 60 and 180° C. via circulating hot oil or superheated steam passed through a jacket around each of reactor, and monitoring and controlling pressure such that an internal pressure within each reactor is maintained above a flash point;
    d) continuously removing and cooling a stream leaving the set of two or more reactors, the stream containing a product of the reaction between the titanium oxide and the sodium hydroxide in the form of a suspension;
    e) separating the product precipitating out by filtration under reduced pressure, decantation or centrifuging, which gives a mother liquor that contains a large amount of sodium hydroxide and can be recycled and used for preparation of a fresh reaction mixture; and
    f) washing the product precipitating out one or more times with water and optionally with acid solutions or solutions of metal salts in order to promote ion exchange of sodium.

2. Continuous process for the preparation of sodium titanate nanotubes according to claim 1, characterized in that the process is carried out continuously in two to four reactors connected in series, where the reaction mixture is continuously fed into the first reactor, whose output is used to feed the next reactor, and wherein an increasing temperature gradient is applied to the reactors in a range between 60° C. and 180° C.

3. Continuous process for the preparation of sodium titanate nanotubes according to claim 1, characterized in that the titanium oxide used to prepare the reaction mixture is chosen from amongst the oxide salts of titanium, amorphous titania, anatase, rutile and brookite with a small crystallite size or a high reactivity in an alkaline medium.

4. Continuous process for the preparation of sodium titanate nanotubes according to claim 1, characterized in that the stirring intensity of the reactors is between 50 and 1000 rpm, depending on the type of stirrer used.

5. Continuous process for the preparation of sodium titanate nanotubes according to claim 1, characterized in that the acid solutions are chosen from amongst solutions of hydrochloric, nitric and sulphuric acid.

6. Continuous process for the preparation of sodium titanate nanotubes according to claim 1, characterized in that the metal salts used are chosen from amongst the chlorides, nitrates, acetates and other soluble salts of metals in the group of rare earths, metals of groups VI and VIII, alkali metals, alkaline earth metals and/or transition metals.

7. Continuous process for the preparation of sodium titanate nanotubes according to claim 6, characterized in that salts or hydroxides of the said metals are optionally added to the reaction mixture in order to incorporate them in the titanate structure during the process of hydrothermal synthesis.

8. Continuous process for the preparation of sodium titanate nanotubes according to claim 1, characterized in that the sodium titanate nanotubes obtained have a length of at least one hundred nanometres, an outside diameter ranging from 5 to 50 nm and a specific BET surface area of between 50 and 450 $m^2/g$.

9. Continuous process for the preparation of sodium titanate nanotubes according to claim 1, characterized in that the nanostructures obtained are subjected to a thermal treatment in air or under an inert or reductant atmosphere in order to form one or more adsorbents, additives, intercalation electrodes for rechargeable lithium batteries, composites for solar energy conversion, gas sensor systems and means for the storage and separation of hydrogen.

10. Continuous process for the preparation of sodium titanate nanotubes according to claim 1, characterized in that the wet precipitate obtained after the synthesis, washing and ion exchange can be dried and moulded into nanostructural titanate objects, optionally with the aid of binders and/or fillers.

11. Continuous process for the preparation of sodium titanate nanotubes according to claim 2, wherein the temperature gradient is between 100° C. and 180° C.

12. Continuous process for the preparation of sodium titanate nanotubes according to claim 2, wherein the temperature gradient is between 120° C. and 160° C.

13. Continuous process for the preparation of sodium titanate nanotubes according to claim 6, wherein the rare earths are La and Ce.

14. Continuous process for the preparation of sodium titanate nanotubes according to claim 6, wherein the alkaline earth metals are chosen from the group consisting of Mg, Ca, and Ba.

15. Continuous process for the preparation of sodium titanate nanotubes according to claim 6, wherein the transition metals are chosen from the group consisting of Mn, Fe, Co, Ti, Zr, Cu, Cr, Ni, Ru, Zn, Cd, Mo, W, V, Ta and Sn.

16. Continuous process for the preparation of sodium titanate nanotubes according to claim 10, wherein the binders and/or fillers comprise hydrated aluminas of the peptized boehmite type.

* * * * *